Figure 5:
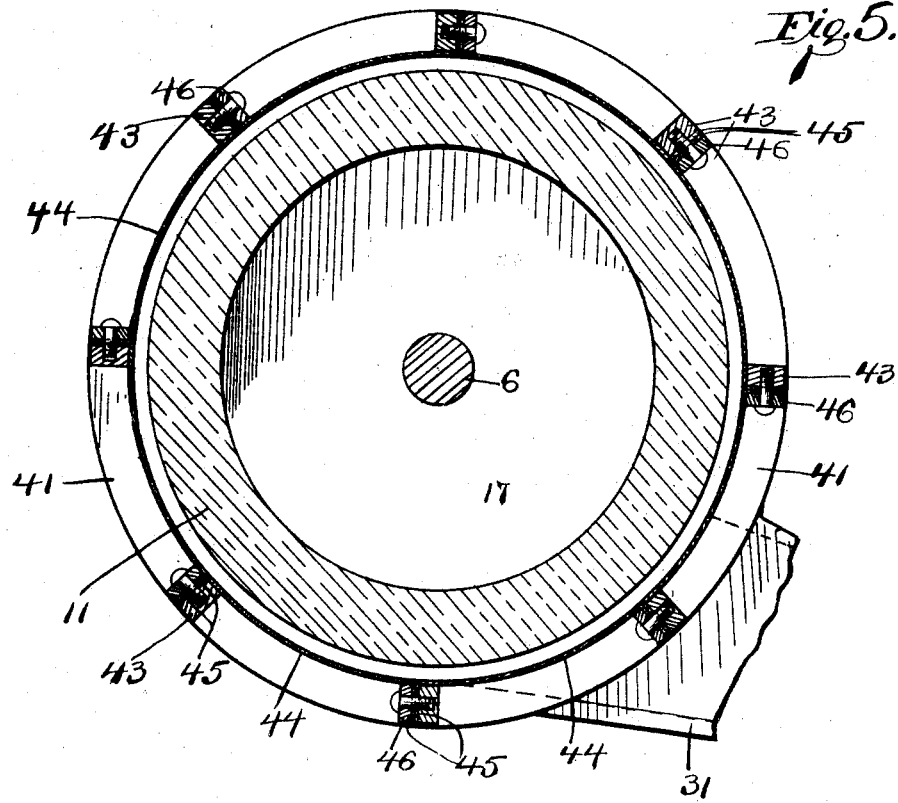

G. H. A. LYFORD.
RICE HULLING MACHINE.
APPLICATION FILED NOV. 27, 1905.
926,991.
Patented July 6, 1909.
3 SHEETS—SHEET 1.
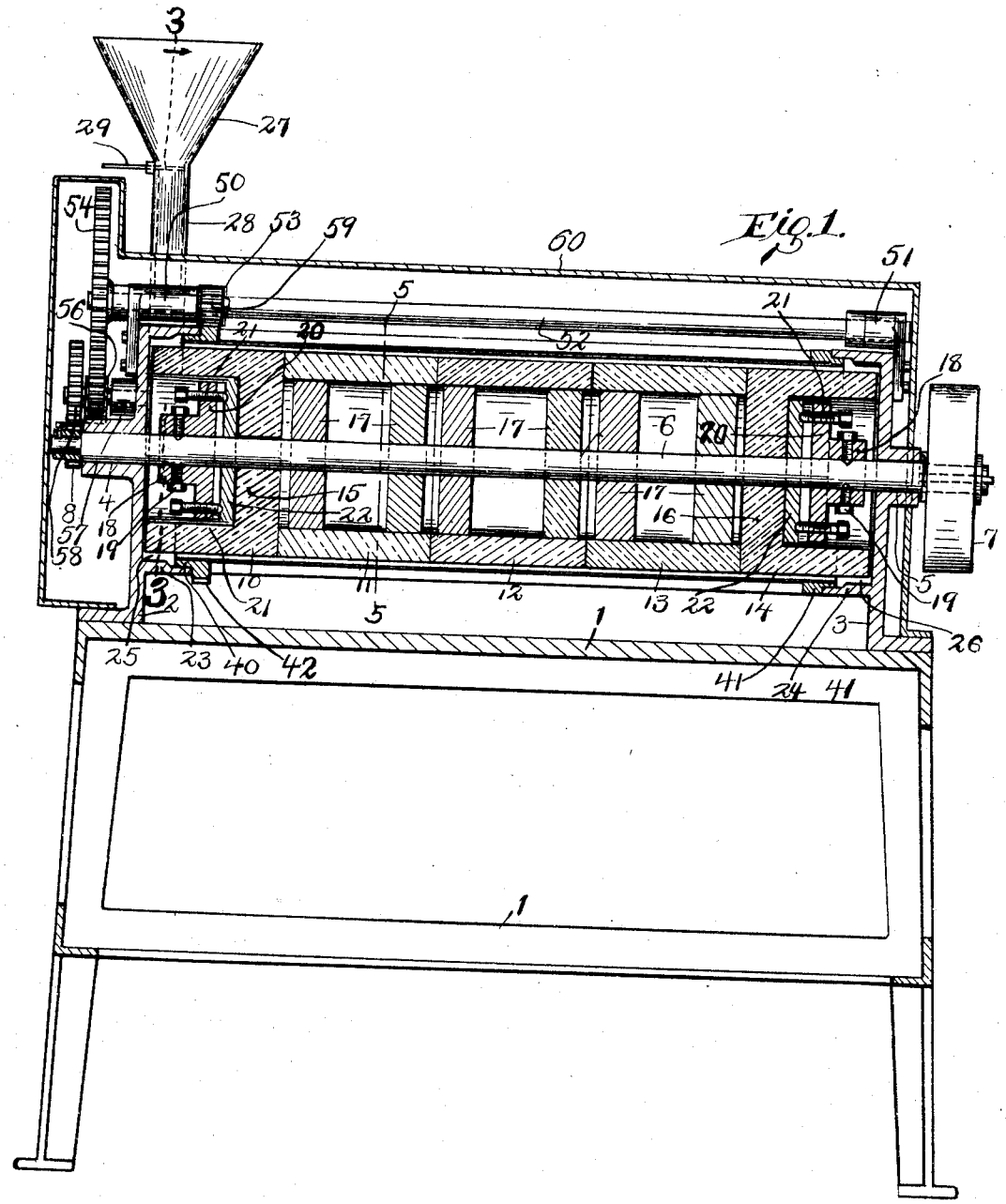
WITNESSES:
Daniel E Daly.
Victor C. Lynch.
INVENTOR
George H. A. Lyford
BY
Lynch & Dover
ATTORNEYS.

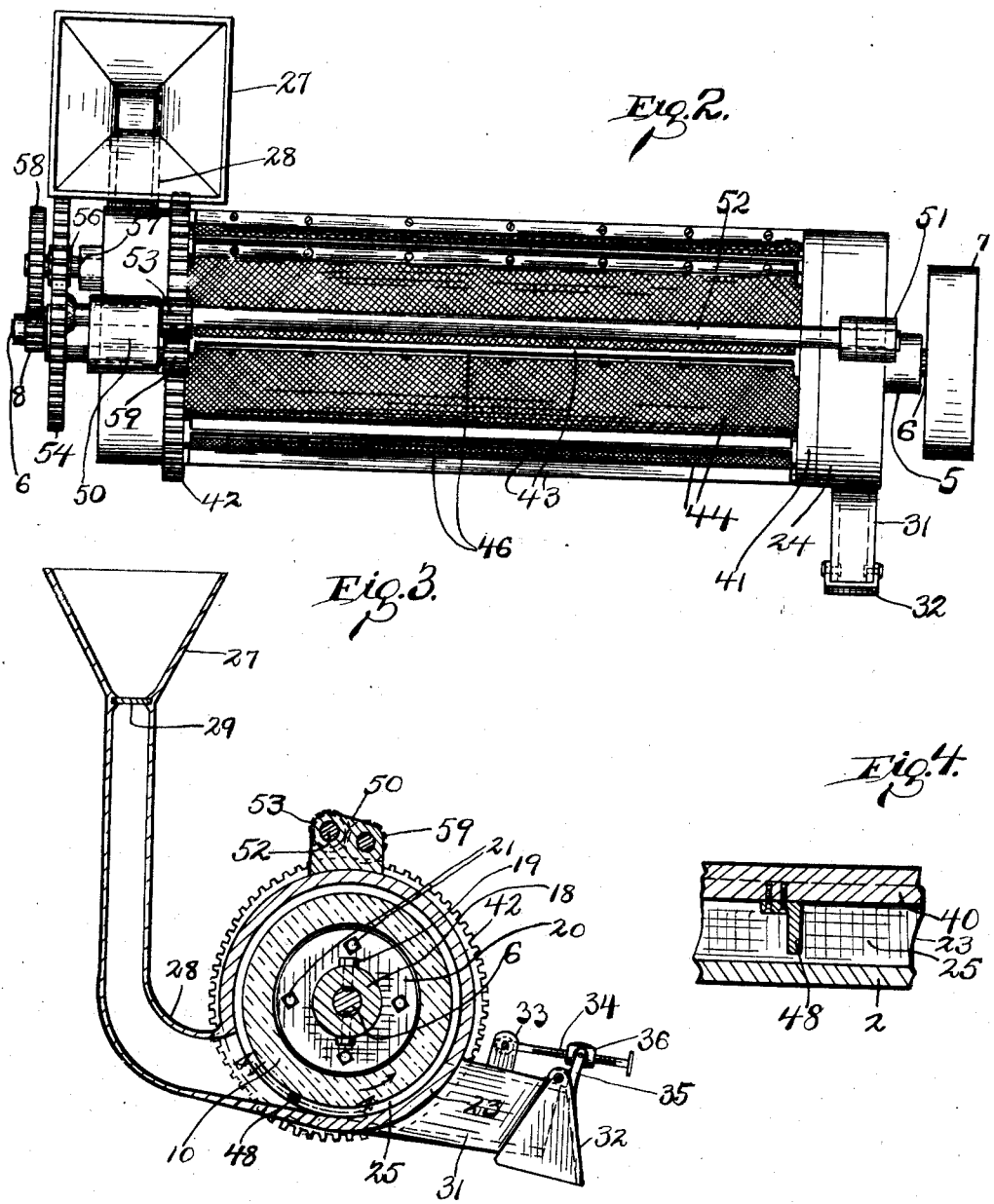

G. H. A. LYFORD.
RICE HULLING MACHINE.
APPLICATION FILED NOV. 27, 1905.

926,991.

Patented July 6, 1909.
3 SHEETS—SHEET 3.

WITNESSES:
Daniel E Daly
Victor C Lynch

INVENTOR
George H. A. Lyford
BY
Lynch & Dorer
ATTORNEYS.

UNITED STATES PATENT OFFICE.

GEORGE H. A. LYFORD, OF CINCINNATI, OHIO.

RICE-HULLING MACHINE.

No. 926,991.  Specification of Letters Patent.  Patented July 6, 1909.

Application filed November 27, 1905. Serial No. 289,272.

*To all whom it may concern:*

Be it known that I, GEORGE H. A. LYFORD, a citizen of the United States of America, residing at Cincinnati, in the county of Hamilton and State of Ohio, have invented certain new and useful Improvements in Rice-Hulling Machines; and I hereby declare the following to be a full, clear, and exact description of the invention, such as will enable others skilled in the art to which it pertains to make and use the same.

This invention relates to improvements in machines for hulling berries, seeds or grain and especially to a machine designed for hulling rice.

The object of this invention is to provide a machine which will thoroughly remove the hull, degerminate and polish the grain by a single continuous operation and which will at the same time automatically separate the bran or flour from the grains and hulls.

A further object of my invention is to provide a machine of this character which will be very durable and which will also have such an arrangement of parts that those portions which do become worn may be readily replaced.

My invention, therefore, consists in providing a hulling cylinder formed entirely of carborundum and providing means for holding the grain in proximity to said cylinder and causing it to travel both around the cylinder and longitudinally thereof at the same time so that the grain in passing through the machine travels in a spiral path around the cylinder.

My invention also consists in the features of construction and combination of parts as described in the specification, pointed out in the claim and illustrated in the accompanying drawings.

In the accompanying drawings Figure 1 is a central longitudinal section of a machine embodying my invention. Fig. 2 is a top plan of the same, with casing removed. Fig. 3 is a section on line 3—3, Fig. 1. Fig. 4 is an enlarged section on line 4—4, Fig. 3. Fig. 5 is a section on line 5—5, Fig. 1.

In general this machine comprises an inner cylinder formed of carborundum and an outer cylinder formed of a material having an open mesh. The outer cylinder forms a loose envelop for the inner cylinder leaving a space for the grain between the outer surface of the inner cylinder and the inner surface of the outer cylinder. Although both of these cylinders really coöperate in all the operations of the machine, for the sake of identification, the inner cylinder may be termed the hulling cylinder as its special function is to abrade or cut the hulls and the outer cylinder may be termed the conveying and screening cylinder as its special function is to hold the grain in proximity to the hulling cylinder and cause it to travel in a spiral path around the hulling cylinder. The two cylinders are operatively connected so that they may be caused to rotate, preferably, in the same direction but at different rates of speed, the conveying and screening cylinder being arranged to rotate much more slowly than the hulling cylinder. The conveying and screening cylinder is not as long as the hulling cylinder and at each end of the machine is arranged an annular trough, one wall of which is formed by the end portion of the hulling cylinder and the other wall by a portion of the frame of the machine. One of these troughs constitutes the intake or feed trough and the other constitutes the outlet or discharge trough. The form and arrangement of these troughs greatly facilitate the operation of the machine as they prevent the material or grain which is being operated on from clogging or packing at the mouth or outlet of the machine and also make it possible to definitely regulate the flow or passage of the grain through the machine.

Again referring to the drawings, 1 represents the base of the machine on which are mounted two members 2 and 3 which constitute the end pieces or supports for the rest of the machine. In suitable bearings 4 and 5, in the members 2 and 3, respectively, is mounted a shaft 6, the ends of which project beyond the said members and on one end of said shaft, at what may be termed the rear end of the machine, is mounted a driving pulley 7 and on the other end, at what may be termed the front end of the machine, is secured a small pinion 8. The hulling cylinder is mounted upon and arranged to turn with the shaft 6 and built up of a number of sections 10, 11, 12, 13 and 14, each consisting of a broad ring of carborundum. The end rings 10 and 14 are provided at their inner ends with walls 15 and 16, respectively, so that the said sections are self-supporting on the shaft 6, but in order to support the intervening sections or rings 11, 12 and 13, while the cylinder is being assembled, a number of wooden disks 17 are arranged on the shaft 6 over which the sections 11, 12 and 13 are slipped. When all the sections are mounted on the shaft they are rigidly clamped together by means of clamping devices which are arranged on the shaft 6, one within each of the sections 10 and 14. Each clamping device comprises a collar 18 which is rigidly secured to the shaft 6 by means of screws 19. An annular flange 20 is formed on the collar 18 and in the flange 20 are mounted set screws 21 which are arranged to be screwed up against a washer 22 arranged against the adjacent end wall of the cylinder section. On each of the end pieces 2 and 3 around the ends of the hulling cylinder are formed annular flanges 23 and 24, respectively, so as to leave a space between the outer surface of the hulling cylinder and said flange, thereby forming annular troughs 25 and 26 around the ends of the hulling cylinder. The trough 25, at the front end of the cylinder, is the intake trough and in proximity thereto is arranged a hopper 27 having a spout or passage-way 28 which communicates with the intake trough near its bottom. The hopper is, preferably, provided with a valve 29. The trough 26 at the rear end of the machine constitutes the discharge trough at its lower end. The outlet spout 31 is provided with a cap 32 which is hinged to said spout so as to hang down over the mouth of the spout. An arm 33 is mounted on the spout 31 in which is swiveled one end of an endless screw 35. An arm 36 is secured to the cap 33 and on this arm is pivotally mounted a nut 36 which is arranged to travel on the endless screw 34. By turning the screw 35 one way or the other the cap can be caused to approach or move away from the mouth of the spout 31 and thereby regulate the flow of the grain through the spout. The flanges 23 and 24 also form the bearings for the conveying and screening cylinder which consists of two rings 40 and 41 respectively which are arranged to rest in the respective flanges so as to turn freely therein. The ring 40 is provided with teeth 42. The rings 40 and 41 are connected by cross bars 43, preferably eight in number, between which are stretched the curved sections of screening material 44. The screen sections 44 are secured to the bars 43 as follows:—The longitudinal edge of each screen section 44 is bent at an approximate right angle to the rest of the section, forming flanges 45 and one of these flanges is laid along the side edge of one of the bars 42 and the screen section is stretched across the space between the said bar and the next bar thereto and is carried under the last-mentioned bar and the other flange thereof is laid against the farther side of the last-mentioned bar. One of the flanges on the next section of screen is then placed against the last-mentioned flange on the first section of screen and a plate 46 is laid along the bar and is secured thereto so as to clamp the flanges of the screen sections to the bar. The object of this arrangement is to cover the under side of each bar 42 with the screen material in order to form a continuous cylinder of the screening material, as the function of the said screening material is not only to screen the grain but also to assist in polishing it and causing it to travel around the hulling cylinder. On the ring 40 of the screening cylinder is secured a finger 48 which is arranged to extend into the trough 25 and travel around therein as the screening cylinder turns. This finger 48 greatly facilitates the entrance of the grain between the screening cylinder and the hulling cylinder and prevents the grain from clogging in said trough 25. The two cylinders are operatively connected, so that they will revolve together, by means of a series of gears and pinions as follows:—In suitable bearings 50 and 51 on the respective end pieces 2 and 3 is journaled a shaft 52 on which is secured a pinion 53 and a large gear wheel 54. The pinion 53 is arranged to mesh with a pinion 59 which meshes with the teeth 42 on the ring 25. The gear wheel 54 is arranged to mesh with a pinion 56 on a small shaft 57 and on the same shaft 57 is also arranged a gear wheel 58 which is arranged to mesh with the pinion 8 on the shaft 6.

All the operative portions of the machine are, preferably, inclosed in a casing 60.

The operation of the machine when hulling rice is as follows: The rice which is to be hulled is placed in the hopper and the valve is then opened to allow the proper quantity to flow down through the spout and enter at the bottom of the trough 25. As the cylinder revolves the finger 48 will travel around the trough 25 and cause the rice to feed between the hulling cylinder and the screening cylinder and as the screening cylinder revolves around the hulling cylinder the rice will be carried around the hulling cylinder and longitudinally thereof so that it will travel in a spiral path through the machine. When the machine is in operation the rice, of course, is constantly moving, but it moves as a body, that is the individual grains may be regarded as being in a certain degree stationary for they are held or retarded by the mesh of the screening cylinder and the surrounding grains and therefore the attrition of the hulling cylinder cuts off or abrades the corners of the hulls. It may be here noted that better results are obtained and much more economically by the use of a hulling cylinder formed entirely of carborundum than it has been possible to obtain heretofore with a hulling cylinder made from any other material, for the carborundum cylinder readily cuts the hulls without breaking or injuring the grains and also it withstands the action of the hulls which soon destroys the surface of hulling cylinders formed of emery and other materials heretofore used. The space between the cylinders is sufficient to allow the grains to move on each other and the attrition of the grains on each other and also the attrition of the screening cylinder on the grains further assists in removing the hulls and in imparting a high polish to the grains. As the hulls are removed the rice flour falls through the screening cylinder and is collected in any suitable manner. It has been found in practice that the best results are obtained by passing the grains a number of times through the machine and therefore when the grain is first passed through the machine the cap over the outlet spout is arranged so that there will be practically a free outlet and the grain will therefore pass through the machine rapidly and only the larger grains will be acted upon. When the grain is again put through the machine the cap is partially closed down over the outlet spout and this causes the grain to bank up in the machine and thereby greatly increases the attrition between the grain and the cylinders and so on by closing the cap more and more over the outlet the travel of the grain can be retarded as desired and a consequent increase in the attrition between the grains and the cylinder secured. The first few passages of the grain through the machine will completely remove the hulls and the last passage will thoroughly polish the grain and impart a rich luster to it.

What I claim is:—

In a machine of the character indicated the combination of a frame, a shaft mounted in said frame, a series of rings formed of carborundum mounted on said shaft, means for centering said rings on said shaft, collars secured on said shaft, set screws mounted in said collars and arranged to come in contact with and clamp said rings together and a screening cylinder arranged around said rings so as to leave a space between said screening cylinder and the surfaces of said rings.

In testimony whereof, I sign the foregoing specification, in the presence of two witnesses.

GEORGE H. A. LYFORD.

Witnesses:
 GUY W. MALLON,
 T. J. CRANE.